March 10, 1964 E. H. CARRUTHERS 3,124,469
METHOD OF PACKING FISH IN CONTAINERS
Original Filed Jan. 7, 1960 5 Sheets-Sheet 1
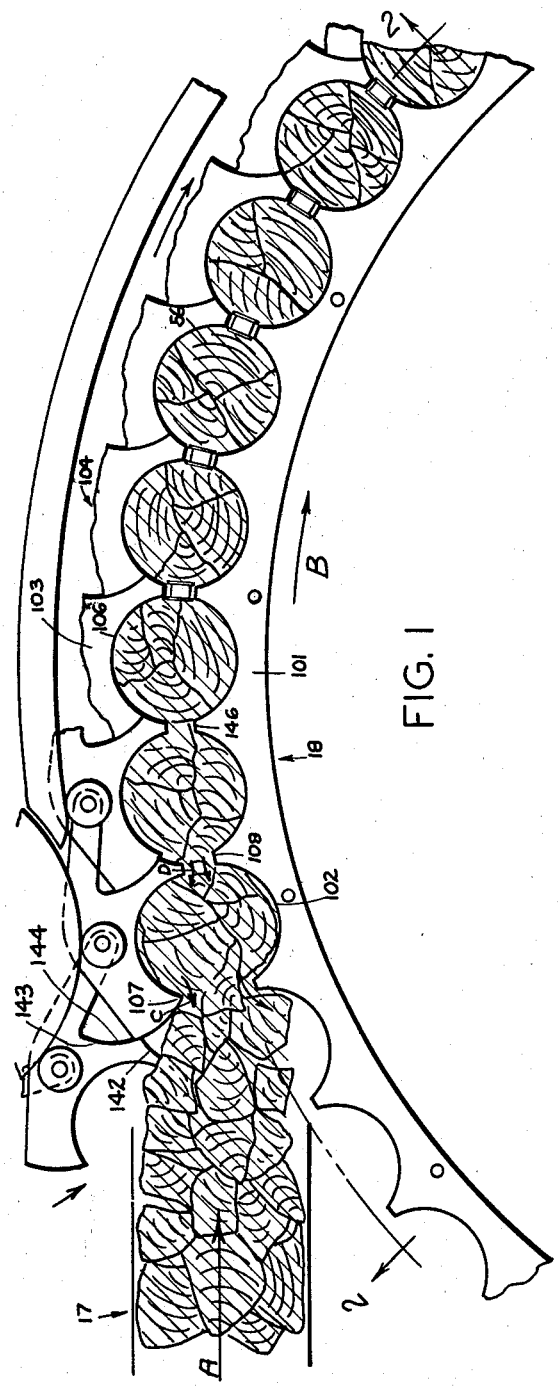
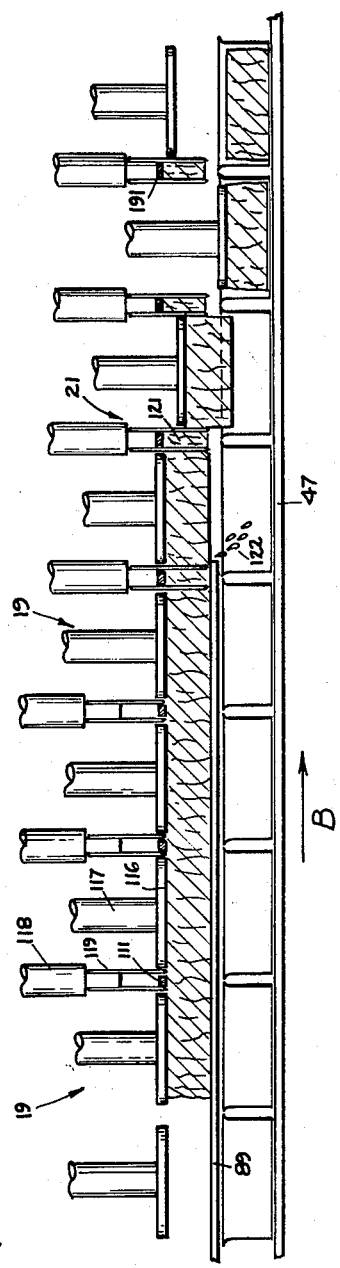
INVENTOR.
EBEN H. CARRUTHERS
BY
*Thomson & Roensel*
*Attorneys*

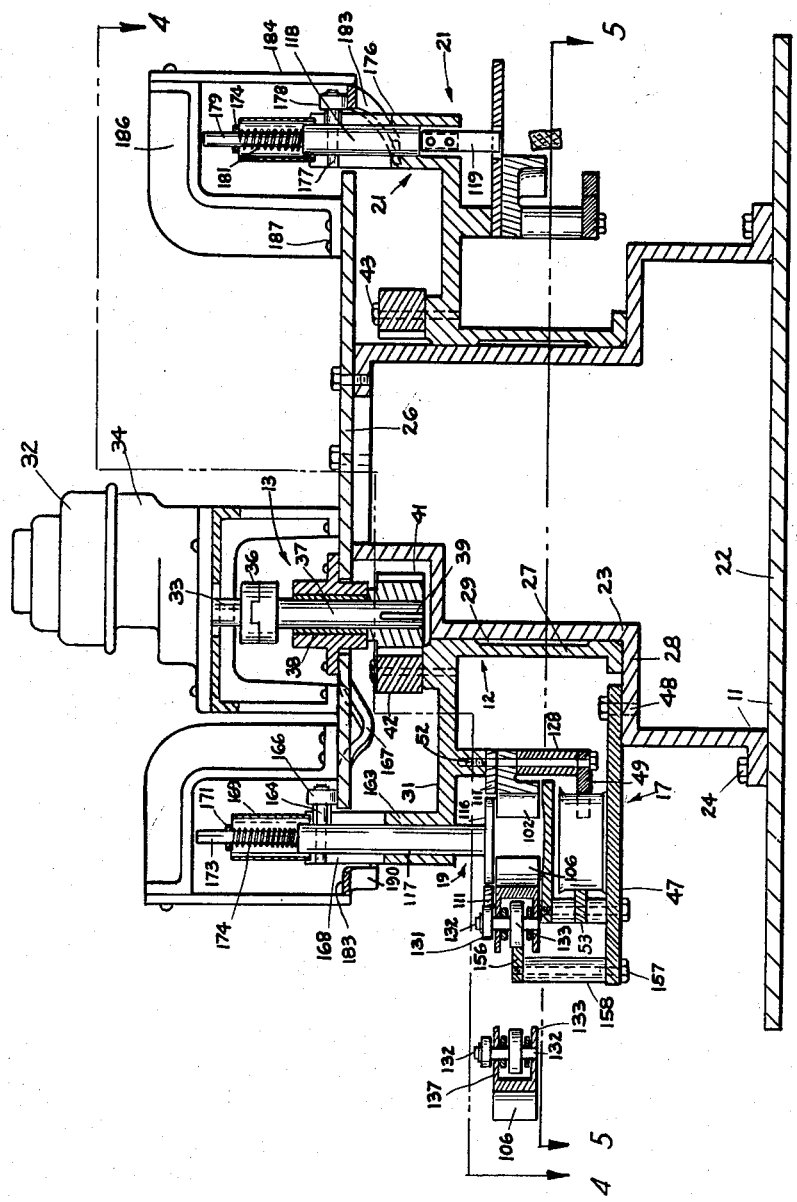

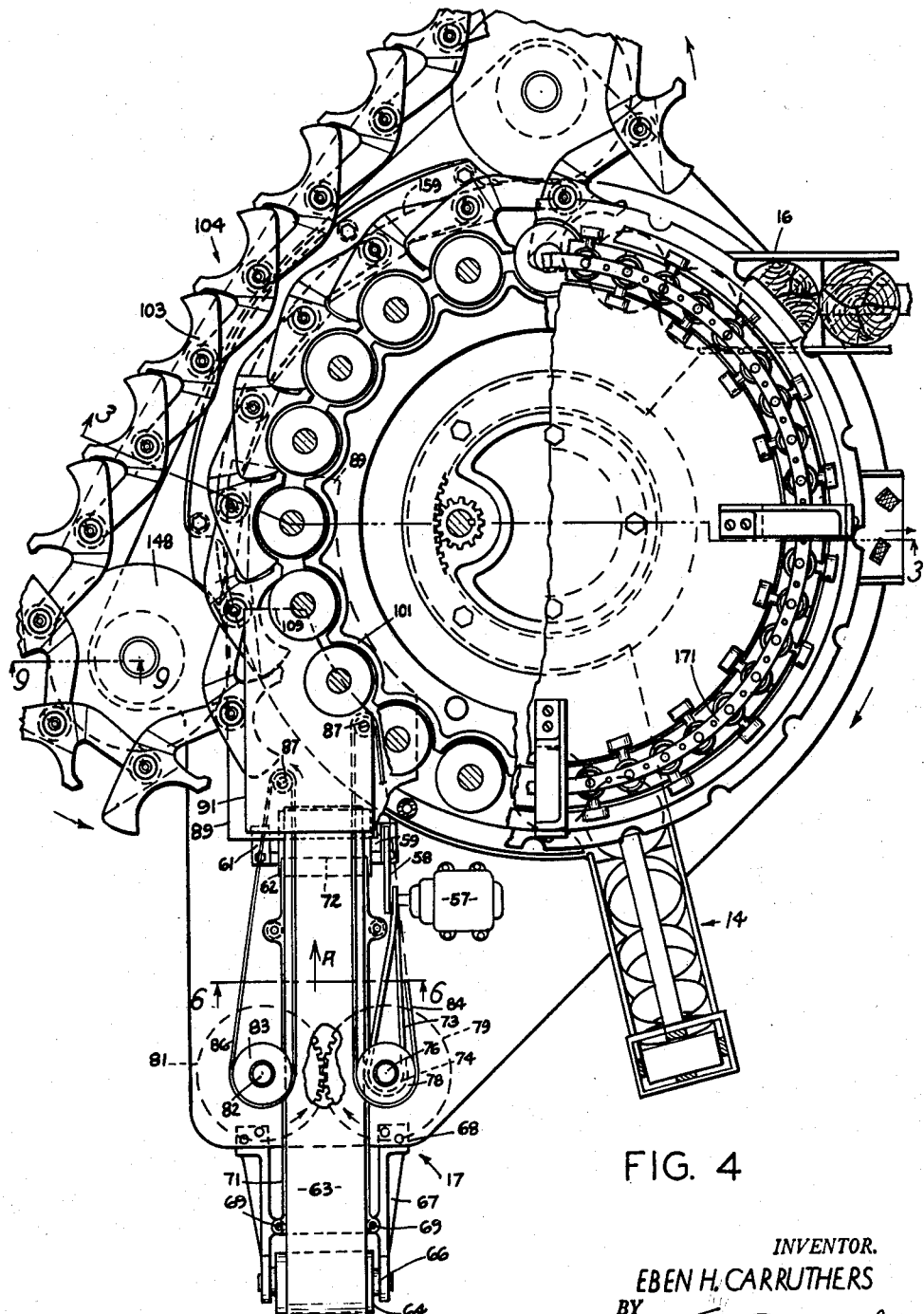
FIG. 4
INVENTOR.
EBEN H. CARRUTHERS
BY
ATTORNEYS

INVENTOR.
EBEN H. CARRUTHERS

March 10, 1964 E. H. CARRUTHERS 3,124,469
METHOD OF PACKING FISH IN CONTAINERS
Original Filed Jan. 7, 1960 5 Sheets-Sheet 5

INVENTOR.
EBEN H. CARRUTHERS
BY
Thomson & Roessel
attorneys 3,124,469
METHOD OF PACKING FISH IN CONTAINERS
Eben H. Carruthers, P.O. Box 1332, Warrenton, Oreg.
Original application Jan. 7, 1960, Ser. No. 1,077. Divided and this application Nov. 14, 1960, Ser. No. 69,061
13 Claims. (Cl. 99—188)

This invention relates to a method and machine for packing materials into containers.

This machine of my invention is particularly adapted for packing a predetermined weight of tuna fish in what is known as fancy solid pack into each of a series of containers. Reference is made to my prior Patents Nos. 2,601,093, issued June 17, 1952, and 2,669,378, issued February 16, 1954. This application is a divisional application of my application Serial No. 1,077, filed January 7, 1960.

While the method and machine of my invention will be particularly described in connection with the packing of tuna fish, the method and machine may be employed in the packing of other fish products and may be adapted for the packing of other materials, particularly food products.

The bulk of tuna packed in this country is derived from fishing areas off the coast of Central and South America. Most of the tuna fish caught in these areas are known by the specie names yellow fin, skip jack and blue fin. Because of the distances involved from the fishing areas to the packing plants, most of which are located in San Diego or San Pedro, California, the fish are frozen on shipboard as they are caught and arrive at the packing plants in a frozen condition. Such fish, if they are cleaned and canned immediately after thawing, are usually hard and firm and a good so-called solid pack of tuna may be accomplished with the method and machine of the above-mentioned patents.

While the method and machine of the above-mentioned patents is suitable for packing most tuna at least where the fish are hard and firm, I have found when the flesh of the fish is soft and flabby more difficulty is encountered in packing. The container when opened does not present to the housewife a solid pack of tuna which is entirely pleasing in appearance. Soft tuna may arise from a number of different conditions. For example, the character of the fish may present packing problems or the tuna may be held too long in a warm atmosphere prior to canning. However, the main source of soft fish is albacore tuna.

Albacore tuna is caught along the coast of lower California, primarily along the coast of California, but does occur to and beyond the Canadian Pacific border. Albacore tuna due to the fact that it is caught not too far from the packing plants, is seldom frozen prior to being brought to the packing plants. Usually, the canners make an effort to can such unfrozen tuna promptly, but since most of the albacore tuna is caught during the months of July, August, and September, the air temperature is relatively warm and the fish are relatively soft due to exposure after being caught to warm air. Under such conditions, a satisfactory pack of tuna is difficult to accomplish by the method and machine of the above-mentioned patents. While the method and machine of my invention has been developed primarily to solve the soft fish problem, it, of course, may be used on the same tuna for which the method and machine of the above-mentioned patents is adapted.

An object of my invention is to provide an improved method and machine for packing materials, particularly soft tuna.

Another object of my invention is to provide a method and machine for packing fish, particularly tuna, into each of a series of containers in which the tuna is first guillotined into pieces of the desired height to be placed in the containers; and then continuously feeding the pieces to a forming station or section where the tuna is molded into the desired shape to be fitted into the containers to be filled, the action being one of forcing the material at the forming station into forming elements to fill any possible voids encompassed by the forming elements.

Another object of my invention is to continuously feed and crowd tuna which has been pre-guillotined to a forming area where a pair of forming jaws gradually close and form a section or slug of tuna corresponding in cross-sectional area to the cross-sectional opening in the can or other container, the forming action being opposed by the feeding of the tuna to the end that voids encompassed by the forming elements are filled and the excess material is forced in a direction opposite to the direction to which the material is fed to thereby provide a slug or chunk of tuna which is substantially voidless and of constant volume and therefore of substantially constant weight.

Still another object of my invention is to recover the juices extracted from the fish, to a large extent wasted by present methods and return such juices to the containers.

A further object of my invention is to provide a method and machine in which pre-guillotined pieces of tuna are force fed to a forming station and there forced into forming chucks which gradually close to form by pressure on the pieces a slug or cake of tuna of substantially predetermined volume and therefore weight, the forces exerted on the tuna during force feed and during the forming action being primarily directed in a direction transverse to the long direction of the loins of tuna from which the pieces are cut, the operation being carried out while the pieces and the slugs into which they are formed are continuously moving.

Another object of my invention is to provide a method and machine for packing tuna fish wherein the machine has a multiplicity of pairs of molding elements defining forming chucks, one of said pairs being driven in a circular path and the other being driven by a chain assembly, the chain assembly being so arranged and guided that the paths of the two pairs of forming elements are in a definite relationship and the forming elements gradually close to define a cylinder open at two sides so that excess material is gradually crowded back in a direction against the flow of tuna whereby voids are filled and the volume of tuna encompassed by the forming elements is of substantially constant weight.

My invention further contemplates the feed of successive containers or cans in substantially lip-to-lip relationship to a can-filling station, adjacent which a slug of tuna is formed to fit the can, the slugs of tuna being transferred to the cans and the method and machine including cutoff mechanism which cuts a small wafer of tuna from between successive slugs or cakes to make allowance for the distance between the lips of two adjacent cans.

Other objects and advantages of this invention will be particularly set forth in the claims and will be apparent from the following description, when taken in connection with the accompanying drawings, in which:

FIG. 1 is a top plan schematic view showing the feeding of the guillotined tuna to the forming station and the method by which the tuna slugs or cakes are formed so as to fill voids in the slugs of tuna;

FIG. 2 is a sectional schematic view taken substantially on the line 2—2 of FIG. 1 in the direction indicated by the arrows;

FIG. 3 is a vertical sectional view of the machine of my invention;

FIG. 4 is a sectional view taken substantially on the line 4—4 of FIG. 3 in the direction indicated by the arrows;

Figure 5:
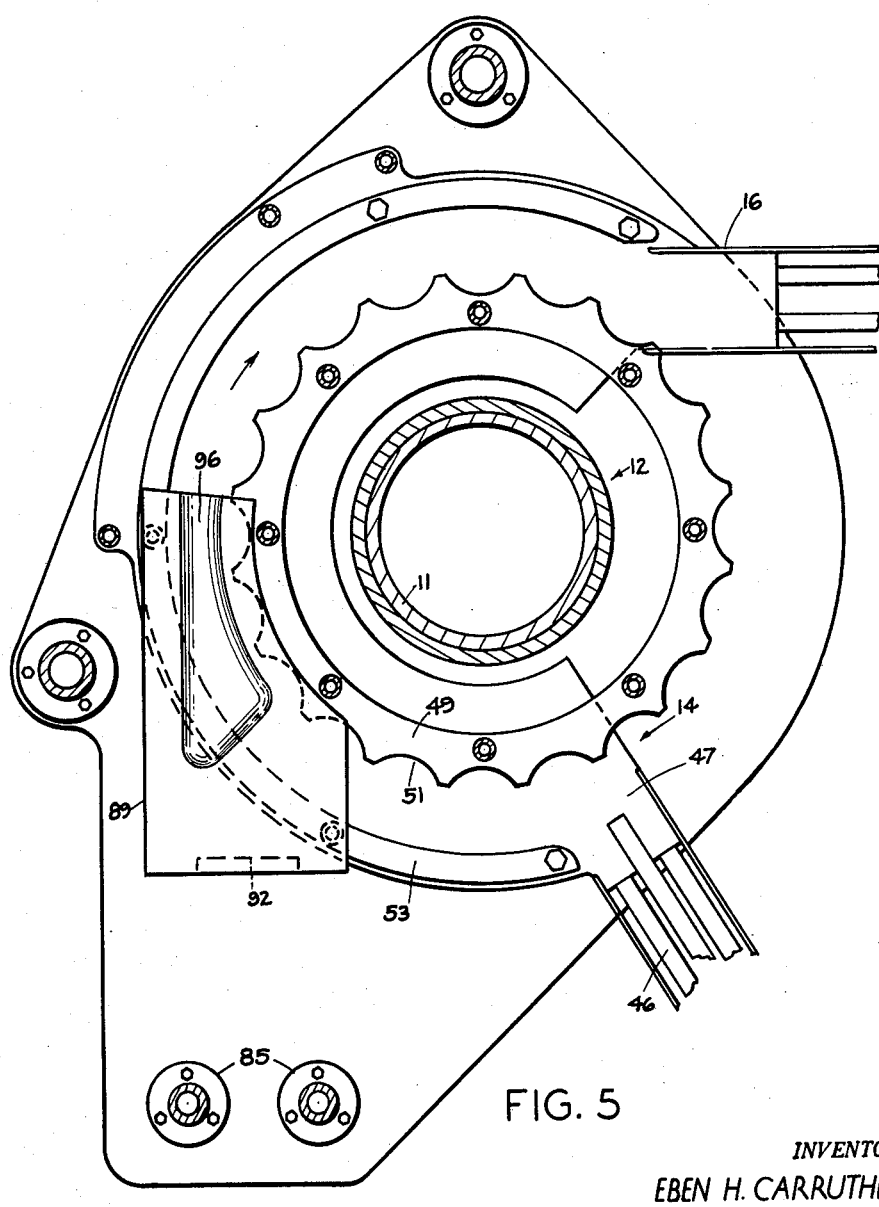
FIG. 5 is a sectional view taken substantially on the line 5—5 of FIG. 3 in the direction indicated by the arrows.

While the method and machine of my invention will be described in connection with the canning of tuna fish, it will be understood that the method and machine have application in the packing of other fish and may be employed in the packing of other products. In general, the machine of my invention comprises a support 11 (FIG. 3); a rotatable turret assembly, generally indicated by the numeral 12 (FIGS. 3 and 5); a driving mechanism, generally indicated by the numeral 13, for driving the turret assembly (FIG. 3); a can feeding and driving unit, generally indicated by the numeral 14 (FIGS. 3, 4 and 5); a filled can discharge chute 16 (FIGS. 4 and 5); a fish feeding mechanism, generally indicated by the numeral 17 (FIGS. 3 and 4); a fish forming section (FIG. 1), generally indicated by the numeral 18, and mechanism for operating the elements thereof; a mechanism for filling the containers with fish, generally indicated by the numeral 19 (FIGS. 2 and 3); and cutoff means, generally indicated by the numeral 21.

As shown most clearly in FIG. 3, the support 11 comprises a table 22 carried by suitable legs (not shown), a pedestal 23 bolted, as shown at 24, to the table and a fixed cam plate 26 bolted to flanges formed on the top of the pedestal.

The rotatable turret assembly, generally indicated by the numeral 12, comprises a turret 27 axially located with respect to the center of the machine seated upon and rotatable with respect to an annular flange 28 formed on the pedestal. Suitable means (not shown) are provided to supply lubricant to an oil groove 29 between the rotatable turret and the stationary pedestal. The turret assembly further includes a turntable 31 which supports mechanism presently to be described.

The driving means for the turret assembly, generally indicated by the numeral 13, comprises an electric motor 32 preferably of the variable speed type. The variable speed motor is connected to a drive shaft 33 by suitable reduction gearing enclosed within a casing 34. The shaft 33 is connected by a flexible coupling 36 to a driven shaft 37 mounted in a suitable bearing assembly 38. Keyed to the driven shaft, as indicated at 39, is a spur gear 41 which mates with and rotates an internal ring gear 42 axially located with respect to the machine. The ring gear is bolted to the turntable assembly by bolts 43 whereby upon rotation of the motor the ring gear and rotatable turret assembly are rotated about the spur gear.

Referring now to FIGS. 3 and 5, the can feeding and driving unit comprises a can chute 46 into which cans are fed usually from a can loft located above the fish filling floor. The cans are deposited from the can chute onto a stationary can plate 47 which extends partway around the machine from the empty can entrance to the filled can discharge. The can plate 47 is bolted by a series of bolts one of which is shown at 48, to the annular flange 28 of the pedestal 23 in spaced relation to the table 22. A can drive ring 49 having can embracing cutouts 51 (FIG. 5) is bolted by through bolts 52 to an annular boss formed on the underside of the turntable 31. This assembly will be more particularly described later. A can guide ring 53 is mounted on the can plate by means presently to be described and forms a partial circle extending around the can plate from the can entrance chute to the can discharge chute 16. The margins of the cutouts or can pockets and the can guide ring force the cans to rotate over the can plate in a fixed circle path about the vertical axis of the machine.

It will now be understood that the cans enter the intake chute 46, travel over the can plate 47 as driven by the can drive ring 49 in accordance with the rotation of the turret and are discharged off the can plate at the can discharge chute 16. During travel through this arcuate path, the cans are held rigidly and register with the forming chucks and filling mechanism as will presently appear. Preferably, for reasons which will presently appear, the cans move over the can plate in substantially lip-to-lip relation.

As shown in FIG. 1, the fish is first guillotined by cutting the four loins of each fish transversely of their length. Machines for guillotining fish are well known in the art to which this invention applies and need not be described. It is sufficient for the purposes of this invention to state that the fish are guillotined into slices or pieces of a height substantially that to be placed in the containers. In tuna fish, as in most fish, the loins extend longitudinally of the fish and are separated from each other into four quadrants by bones and membranes. The flesh of the fish extend in annular rings outward from the central spinal column as indicated by the rings 56 in FIG. 1.

Tuna fish will withstand pressure exerted substantially normal to these layers but will not withstand any substantial pressure exerted longitudinally of the layers. If any substantial pressure is exerted longitudinally of the loins the fish breaks up into a mass suitable, for the most part, only for packing as grated tuna. The method and machine of my invention has been designed to exert only such pressure as will not break up the fish, the purpose being to produce what is known in the industry as fancy solid pack tuna.

Figure 6:
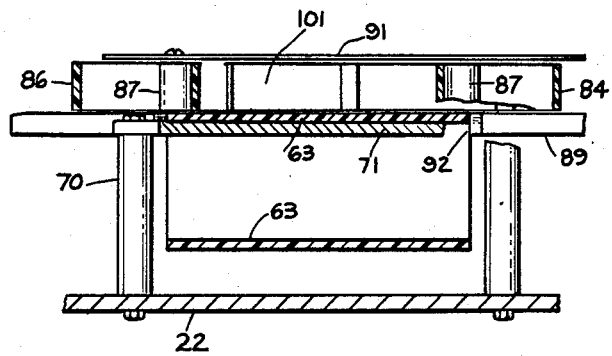
FIG. 6 is a sectional view taken substantially on the line 6—6 of FIG. 4 in the direction indicated by the arrows.

Referring now to FIGS. 4 and 6, a motor 57, preferably of the variable speed type has two pulleys mounted on the extended shaft thereof one of which drives a V-belt chain or other driving means 58. The belt 58 drives a shaft 59 supported in suitable bearings mounted in a bracket 61. The bracket is bolted to the table 22. The shaft 59 is rigid with a roller 62 which drives a fish feed belt 63 in the direction indicated by the arrow A in FIG. 4.

The fish feed belt extends over a second idler roller 64 mounted in trunnions 66. The trunnions 66 are carried in brackets 67 fixed to the underside of the table as shown at 68. Carried by the brackets 67, as shown at 69, is a feed belt support plate 71 which is spaced from the table 22 by spacers 70 (FIG. 6) and which supports the fish feed belt and terminates at 72.

The second pulley mounted on the motor shaft drives a belt 73 which in turn drives a pulley 74. The pulley 74 is mounted on and rigid with a vertically extending shaft 76 which also has mounted thereon a pulley 78 and a gear 79. The gear 79 drives a second gear 81 rigid with a shaft 82 upon which is mounted a pulley 83. The shafts are journaled in bearings 85 mounted upon the table (FIG. 5). The pulleys 78 and 83 drive side fish feed belts 84 and 86. The fish drive belts 84 and 86 confine the tuna on the fish feed belt 63 and are approximately the same height as the height of the pieces of tuna. The side feed belts 84 and 86 pass over idler pulleys 87. The side feed belt 84 is longer than the feed belt 86 for a purpose which will be apparent as this description progresses.

As shown most clearly in FIG. 6, the side fish feeding and confining belts pass between a lower transition plate 89 and an upper transition plate 91. These transition plates are spaced apart a distance substantially corresponding to the height of the pieces of tuna being packed. At its forward end the lower transition plate is relieved, as indicated at 92, to allow room for the driving roller and the fish feed belt to turn downward and smoothly transfer the pieces of fish to the lower transition plate 89.

The upper transition plate is thin in cross-section for a purpose which will presently be apparent. The upper transition plate 91 is smaller in area than the lower transition plate 89 as will be apparent from a comparison of FIGS. 4 and 5. The lower transition plate 89 has a shallow trough 96 formed in its upper face, the purpose of which will later appear.

The method and machine of my invention has been most clearly illustrated in diagrammatic form in FIGS. 1 and 2. As shown in FIG. 1, the fish feeding section, generally indicated by the numeral 17, feeds the fish in the direction of the arrow A and crowds or forces it in that direction toward the fish forming section 18. As previously described, the fish adjacent the end of the fish feeding section and during part of the slug forming operation, is confined both above and below by the transition plates 89 and 91.

The fish forming section includes a fish forming ring 101 having fish forming sections 102 and driven in the direction of the arrow B from the main turret in a manner which will presently appear. These fish forming sections are segmental cylinders and are of approximately a height to fit between the transition plates and are approximately of the height of the pieces of tuna to be placed in the cans.

The other part of the fish forming sections comprises a multiplicity of links 103 mounted on a chain assembly, generally indicated by the numeral 104 (see FIG. 4). These fish forming links 103 have segmental cylindrical cutouts 106 forming fish forming sections of cylindrical shape also of approximately a height such as to fit between transition plates 89 and 91 and also of approximately the height of the pieces of tuna to be placed in the containers.

As the chain is driven in a manner which will presently appear, the forming sections or chucks 102 and 106 gradually come together and compress the fish into a cake or slug of approximately the diameter, although preferably slightly smaller, than the diameter of the cans into which the fish is to be transferred. It should be understood, with the pieces of fish being crowded by the feeding action in the direction of the arrow A and the space between the fish forming sections 102 and 106 being relatively wide adjacent the numeral 107, that an excess volume of tuna is crowded into the space between the fish forming sections 102 and 106. This crowding action fills voids and insures that an excess of tuna will be encompassed by the fish sections 102 and 106 adjacent the numeral 107.

It will be now noted from FIG. 1, that the fish forming sections 102 and 106 do not quite come together at any point. Adjacent the numeral 107, the fish forming sections 102 and 106 are gradually coming together and partially squeezing out the excess tuna in the direction indicated by the arrow C. This force is directed against the stream of fish being fed in the direction of arrow A. Adjacent the numeral 108, the fish forming sections are more nearly closed and the excess fish embraced by the fish forming sections or chucks is being crowded back against the stream of fish as indicated by the arrows D. The result of the above operations is to fill the volume enclosed by the upper and lower transition plates 89 and 91 and the fish forming sections 102 and 106 with a predetermined volume of tuna substantially without voids. Since the fish is usually of substantial constant density, the weight of enclosed fish is substantially a constant. Should the weight of the fish in the cans as they are discharged from the discharge chute 16 be other than the required weight of tuna to be placed in the cans, either the motor 57 or the motor 32 may be varied in speed to effect a variation in the volumetric fill encompassed by the fish forming sections 102 and 106 to vary the weight of tuna placed in the containers.

As previously mentioned and as appears from FIG. 2, the cans are driven by the can drive ring 49 (FIGS. 3 and 5) which is driven by the turret. The turret also drives the fish forming ring 101, as will presently appear, drives the chain, generally indicated by the numeral 104. Thereby, the cans and tuna cakes or slugs are driven in synchronism with each other. As appears in FIG. 2, the cans move in substantially lip-to-lip relation although some space may be allowed if desired. However, a space between the lips of the cans increases the small wafers of tuna which must be cut from between adjacent cakes as appears from FIGS. 1 and 2. For this reason, in the claims the expression "substantially lip-to-lip relation" of the cans should be interpreted as meaning an actual lip-to-lip relation or a reasonable spacing between the cans.

As will be observed from the examination of FIG. 4, the upper transition plate 91 terminates at 109. Upper transition plate is extremely thin in cross-section and a drive plate 111 rides over a portion of it. A part of this drive plate has been shown in FIG. 7. The drive plate has a multiplicity of cutouts 112 approximately circular in shape. These cutouts have notches 113 to accommodate knives presently to be described. The cutouts or openings 112 in the drive plate accommodate plungers 116 carried by plunger rods 117.

The cutoff between adjacent slugs of tuna is accomplished by a multiplicity of plungers 118 each of which carries two knives 119. The cutoff knives are flat but can be slightly curved to conform to the curvature of the cans and as can be observed from FIG. 2 are forced downward through the tuna and cut out a wafer of tuna 121. This wafer of tuna is of a thickness corresponding to twice the width of the lip of a can plus the spacing between cans, if any. After the wafer has been cut, the plungers 117 are forced downward and the plunger faces 116 force the cakes or slugs of tuna into the cans which are moving in synchronism with the slugs as will be observed from an examination of FIG. 2. The manner in which the plungers 117 and 118 are actuated will be later described.

One of the important aspects of my invention is that in previous machine methods of packing tuna fish, the juices extracted from the tuna, due to the compression of the tuna, were wasted to a large extent. These juices are high in nutrient value and by the method and means of my invention, these juices may be recovered. As previously mentioned, the lower transition plate 89 has a trough 96. As the tuna is squeezed at the forming stations, indicated in FIG. 1, the juices extracted from the tuna drop into this trough which is slightly deeper at its forward end so that the juices drip into the cans of tuna as they pass the forward edge of the lower transition plate as indicated at 122. Since the cakes of tuna are uniformly squeezed and the extraction of juices is substantially uniform, each can receives approximately the same amount of returned juices.

The drive plate 111 (FIG. 7) has a plurality of notches 126 on its periphery, the purpose of which will presently appear. The drive plate also has a plurality of openings 127 through which the trough bolts 52 extend (FIG. 3). These through bolts are threaded into the turret 12 and also extend through openings in the fish forming ring 101. The through bolts are adapted to receive spacing sleeves 128 which space the fish forming ring from the can drive ring 49. It will now be appreciated that, as previously mentioned, the drive plate 111, the fish forming ring 101 and the can drive ring 49 are all driven from the turret and therefore, all the parts are driven in synchronism with each other.

Figure 8:
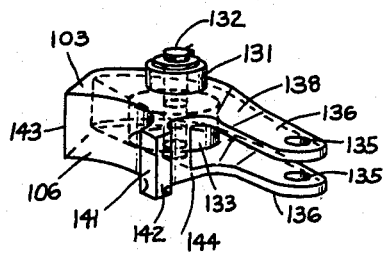
FIG. 8 is a perspective view of one of the forming links.
Figure 7:
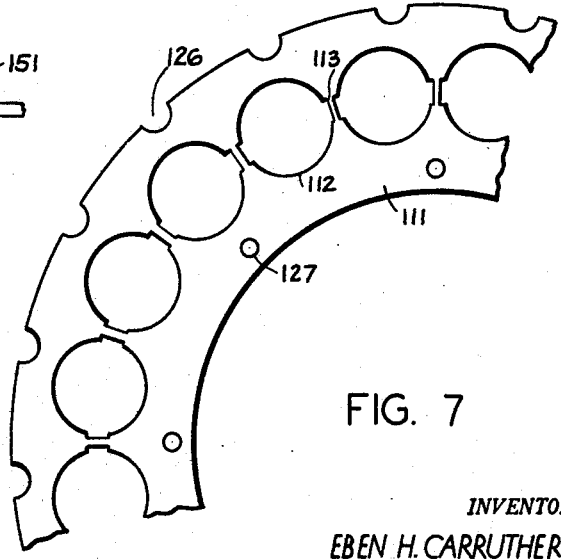
FIG. 7 is a partial top plan view of the drive plate.

Referring now to FIGS. 3, 7, and 8, the notches or cutouts 126 in the drive plate 111 drive rollers 131 (see also FIG. 9) mounted on pins 132. These pins 132 also carry rollers 133 and the links 103 of the chain, generally indicated by the numeral 104 (see FIG. 4).

A perspective view of one of the links has been shown in FIG. 8. Each link includes the forming section 106, a forked end 136 having apertures 135 for receiving the pin 132 of the next adjacent chain link. As shown clearly at the left of FIG. 3, the forked end 136 straddles the roller 133. The opposite end of the link 103 is cut out on the side opposite the forming section 106 to form a bifurcated portion 137 which has openings the margins of which embrace the pin 132 and which straddle the bifurcated end 136 of the next adjacent link. As shown at 138, in FIG. 8, the link is so shaped that the arms of the bifurcated end 136 are spaced a lesser distance apart than the arms of the bifurcated end 137 to permit the straddling of the parts, as above described.

As shown in FIG. 8, and more clearly in the diagrammatical view of FIG. 1, each link includes a wall 141 and a small forming section 142. Each link further includes an arcuate wall 143 and an arcuate wall 144. These walls 143 and 144 are formed on the arc of the same circle and as the forming sections 102 and 106 move toward forming position the walls 143 and 144 move relative to each other. The relatively small forming section 142 moves towards circle forming relation with the forming section 106. When the forming sections are closed, as observed from FIG. 1, the wall 141 faces, but is spaced from, a corresponding wall 146 on the forming ring 101. This forms the gap through which the material is crowded back (arrows C and D) in a direction opposite to the direction in which the material is fed (arrow A).

Figure 9:
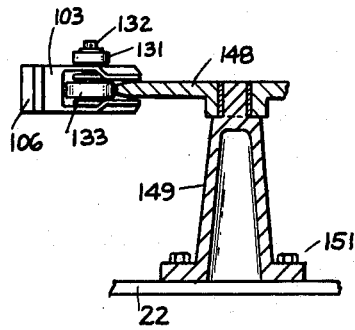
FIG. 9 is a sectional view taken substantially on the line 9—9 of FIG. 4 in the direction indicated by the arrows.

Referring now to FIGS. 4 and 9, the rollers 133 ride upon the peripheries of two discs or turntables 148. The discs are rotatably supported in brackets 149 carried by the table 22 as shown at 151.

Referring now to FIG. 3, a cam ring 156 engages the rollers 133 of the chain links 103 during a portion of the travel of the chain links. The cam ring 156 is supported from the can plate 47 by means of screws 157 and spacer sleeves 158. The cam ring 156 is concentric with the axis of the machine and has been indicated by the dotted line 159 in FIG. 4. It extends approximately between the two discs 148. As previously mentioned, the cam 156 is concentric with the axis of the machine. This is true of the major part of its extent. However, at the entrance end (at the left of FIG. 4) as the rollers 133 leave the disc 148, the cam 156 is shaped so as to pick up these rollers and gradually move them toward the axis of the machine until the forming sections 102 and 106 are brought together. Thus, the forming sections 102 move on an arc which is the axis of the machine and likewise the forming sections 106 move throughout most of their movement move on the arc of a circle which is the axis of the machine. Likewise, the cans are held in the same relative radial position by the can guide or held in ring 53.

Referring now to FIG. 3, the plungers 117 reciprocate in cylinders 163 which are formed integral with the turntable 31. Pins 164 extend through the plungers 117 having rollers 166 mounted on the ends thereof which ride upon the cam plate 26. The rollers 166 ride on the rim of the cam plate 26 which for the most part is flat. However, at the portion where the plungers are to move downward to discharge slugs of tuna into the cans, the periphery of the cam plate is provided with a depressed portion 167 which permits the plungers to be depressed so as to force the slugs or cakes of tuna into the cans in the manner indicated in FIG. 2.

The cylinders 163 are slotted, as indicated at 168, to accommodate the downward movement of the plunger pins. Supported at the top of the cylinders are tubular members 169, the upper ends of which support a circular ring 171 (see also FIG. 4). The upper ends of the plungers 117 are preferably decreased in diameter, as indicated at 173, and these upper ends of the plungers are encircled by springs 174. The springs 174 are backed up by circular ring 171 held down in any suitable manner and exert a downward pressure on the plungers, the plungers being held in the up position against the action of the spring by the cam plate 26. When the rollers reach the depressed portion 167 in the cam plate, the springs force the plungers in a downward direction to eject the slugs from the forming sections.

In FIG. 3 there is also shown one of the plungers 118 which carry the knives 119. These plungers 118 reciprocate in cylinders 176 also carried by the turntable 31. The plungers 118 are pierced by pins 177 which have rollers 178 mounted on the ends thereof. The upper ends of the plungers are decreased in diameter, as shown at 179, and extend through openings in the ring 171. Springs 181 encircle the decreased portions 179 of the plungers and normally urge the plungers in a downward direction. The rollers 178 ride on the upper side of a cam 183 which encircles the machine. The cam 183 is supported on the lower end of downwardly extending members 184 which are carried by brackets 186 supported from the cam plate 26 as shown at 187.

The cam 183 has a depressed portion 190 in the forming section of the machine which causes movement of the knives in the manner indicated in FIG. 2 to cut a wafer of tuna from between adjacent slugs thereof. The tuna is held between the knives as the turret rotates in the lowered position shown at the right of FIG. 2 in which position the knives 119 straddle the bridge 191 between adjacent openings in the drive plate 111. As shown in FIG. 3 just prior to the position of the knives at the right of that view, the cam starts to rise and moves the knives upward against the action of the springs 181 and the wafer of tuna held by the knives is stripped therefrom by the bridge 191.

While I have described and shown the preferred method and machine of my invention, it will be apparent that various changes and modifications may be made therein, particularly in the form and relation of parts, without departing from the spirit of the invention as set forth in the appended claims.

I claim:

1. A method of packing formable food material into each of a series of containers in which the material has been cut to a height corresponding to the height of material desired to be placed in the containers which comprises the steps of feeding the material in a substantially unbroken flow to a forming section, exerting a forming action on the material in a direction substantially normal to its height while the material is moved through said forming section, confining the cut top and cut bottom of the material while it is moving through said forming section, feeding containers in substantially touching relation to a filling position and at the same rate of speed as the material is fed through said forming section and transferring the cut and formed material to the containers successively at said filling position.

2. A method in accordance with claim 1 wherein a small wafer is cut from said material prior to transfer to the containers which represents the part of the material occupied by the lips of two adjacent containers.

3. A method in accordance with claim 1 in which the forming and confining action exerts a crowding back effect contra to the direction of feed of the material so as to fill voids in the material prior to transfer of the material to the containers.

4. A method in accordance with claim 1 wherein a small wafer is cut from said material prior to transfer to the containers which represents the part of the material occupied by the lips of two adjacent containers and in which the forming and confining action exerts a crowding back effect contra to the direction of feed of the material so as to fill voids in the material prior to transfer of the material to the containers.

5. A method of packing tuna fish into each of a series of containers in which the tuna has been precut in planes extending transversely of the length of the fish into pieces of a height corresponding to the height of tuna desired to be placed in each of the containers which comprises the steps of feeding the pieces in a substantially unbroken flow to a forming station, exerting a confining pressure at said forming station on the pieces in a direction parallel to the planes along which the tuna has been precut while continually moving the tuna and crowding back the excess tuna beyond a predetermined volume in a direction opposite to the direction the pieces are fed to form moving cakes of tuna of approximately predetermined weight.

6. In a method in accordance with claim 5, the additional steps of feeding containers in a substantially unbroken flow in synchronism with the movement of said cakes and transferring the formed cakes successively into successive containers.

7. A method in accordance with claim 5 wherein the cakes of tuna are confined by forces parallel to their cut faces and in the planes thereof as the cakes are formed.

8. In a method in accordance with claim 5, the additional steps of feeding containers in a substantially unbroken flow in synchronism with the movement of said cakes, cutting wafers of tuna from between adjacent cakes corresponding in thickness to the spacing between adjacent containers and the lips thereof.

9. A method in accordance with claim 5, the additional steps of feeding containers in a substantially unbroken flow in synchronism with the movement of said cakes and transferring the formed cakes successively into successive containers and depositing the juices extracted from the tuna during the pressure step into the containers as they flow.

10. A method of filling containers with fish which has been cut transversely of the loins to form slices of fish of a height less than the height of the containers which the slices are to occupy which includes the steps of:
    (a) feeding the containers to a filling position,
    (b) feeding the slices of fish to a forming position short of said filling position,
    (c) forming and confining the fish slices into slugs of fish at said forming position,
    (d) moving said slugs of fish to the filling position,
    (e) removing wafers of fish from between adjacent slugs of fish, and
    (f) transferring said slugs less the removed wafer to the containers in timed succession.

11. A method in accordance with claim 10 which includes the step of feeding the containers in substantially lip to lip relation with the wafer being cut of a width substantially twice the width of the lip of a container.

12. A method in accordance with claim 10 in which the conforming and confining action exerts a crowding back action contra to the direction of feed of the fish so as to fill voids in the fish slugs prior to the transfer of the fish to the containers.

13. A method of filling containers with fish which has been cut transversely of the loins to form slices of a height less than the height of the containers which the fish is to occupy which includes the steps of:
    (a) feeding the containers to a filling position,
    (b) feeding the slices of fish to a forming position short of said filling position while confining the fish at the top and the bottom,
    (c) forming and confining the fish at the sides thereof while leaving access to the flow of fish in the direction of feed,
    (d) squeezing the fish until slugs of fish are formed and simultaneously crowding the fish in a direction opposed to the direction of feed,
    (e) directing the juices squeezed from the fish into the containers,
    (f) moving said slugs of fish to the filling position, and
    (g) transferring said slugs to the containers in timed succession.

References Cited in the file of this patent

UNITED STATES PATENTS

| | | |
|---|---|---|
| 1,268,739 | Longrod | June 4, 1918 |
| 2,601,093 | Carruthers | June 17, 1952 |
| 2,602,578 | Carruthers | July 8, 1952 |
| 2,669,378 | Carruthers | Feb. 16, 1954 |
| 2,840,121 | Carruthers | June 24, 1958 |